United States Patent
Ulrich (10) Patent No.: US 11,157,594 B2
(45) Date of Patent: Oct. 26, 2021

(54) MATRIX MULTIPLICATION IN HARDWARE USING MODULAR MATH

(71) Applicant: Facebook, Inc., Menlo Park, CA (US)

(72) Inventor: Thomas Mark Ulrich, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

(21) Appl. No.: 16/521,294

(22) Filed: Jul. 24, 2019

(65) Prior Publication Data

US 2021/0026916 A1    Jan. 28, 2021

(51) Int. Cl.
*G06F 17/16* (2006.01)
*G06F 7/44* (2006.01)

(52) U.S. Cl.
CPC .............. *G06F 17/16* (2013.01); *G06F 7/44* (2013.01)

(58) Field of Classification Search
CPC .......... G06F 17/16; G06F 7/44; G06F 7/5443; G06F 2207/3832
USPC ........................................................ 708/520
See application file for complete search history.

(56) References Cited

U.S. PATENT DOCUMENTS

| | | | |
|---|---|---|---|
| 2010/0070548 A1* | 3/2010 | Gashkov | G06F 7/724 708/232 |
| 2012/0324319 A1* | 12/2012 | Grinchuk | H03M 13/616 714/807 |
| 2013/0311532 A1 | 11/2013 | Olsen | |
| 2018/0218275 A1 | 8/2018 | Arrigoni | |
| 2019/0044699 A1* | 2/2019 | Satpathy | H04L 9/0631 |
| 2019/0205094 A1 | 7/2019 | Diril | |

* cited by examiner

*Primary Examiner* — Tan V Mai
(74) *Attorney, Agent, or Firm* — Van Pelt, Yi & James LLP (57) ABSTRACT

A first group of modulo result matrices corresponding to modulo of elements of a first matrix by each of a plurality of moduli is stored. A second group of modulo result matrices corresponding to modulo of elements of a second matrix by each of the plurality of moduli is stored. It is determined whether an element operation of a multiplication of the first matrix with the second matrix can be performed using a first hardware multiplication module rather than a second hardware multiplication module. In response to a determination that the element operation can be performed using the first hardware multiplication module, the element operation is performed using the first hardware multiplication module including by multiplying one or more corresponding elements from the first group of modulo result matrices with one or more corresponding elements from the second group of modulo result matrices.

20 Claims, 4 Drawing Sheets

MATRIX MULTIPLICATION IN HARDWARE USING MODULAR MATH

BACKGROUND OF THE INVENTION

Matrix multiplication is a central operation in many numerical algorithms used in many scientific and engineering computations. For example, matrix multiplication is an important component in artificial intelligence computations, such as inference. Matrix multiplication is a computationally intensive operation that oftentimes requires significant computer memory, processor, and data transfer resources. Many arithmetic and logic operations may be needed for a single multiplication of two matrices. For example, directly applying the mathematical definition of matrix multiplication results in an algorithm that requires time on the order of $n^3$ ($O(n^3)$ in big O notation) to multiply two n×n matrices. There exists a need for hardware and techniques to reduce the computational burden of matrix multiplication.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for performing matrix multiplication in hardware using modular math is disclosed. The disclosed system includes a memory configured to store a first group of modulo result matrices corresponding to modulo of elements of a first matrix by each of a plurality of moduli and store a second group of modulo result matrices corresponding to modulo of elements of a second matrix by each of the plurality of moduli. The disclosed system also includes an integrated circuit configured to determine whether an element operation of a multiplication of the first matrix with the second matrix can be performed using a first hardware multiplication module rather than a second hardware multiplication module and, in response to a determination that the element operation can be performed using the first hardware multiplication module, perform the element operation using the first hardware multiplication module by multiplying one or more corresponding elements from the first group of modulo result matrices with one or more corresponding elements from the second group of modulo result matrices. A practical and technological benefit of the disclosed system is reduced computational burden and lower power consumption when performing matrix multiplication.

Multiplication of two matrices A and B involves computing the dot product of each row of A with each column of B. For every row of A and column of B, pairs of corresponding elements are multiplied and the products are added together. If A and B are n×n matrices of 8-bit integers, $n^3$ 8-bit multiplications are required. Because there are only $n^2$ elements in A and B, it would be useful if precomputed values from A and B could be used to reduce the complexity of the multiplications. In terms of computational complexity, this could convert some of the $O(n^3)$ complexity of the matrix multiplication algorithm to $O(n^2)$ complexity, thus providing an efficiency gain. Hardware and techniques to achieve this efficiency gain are described herein.

As described in further detail herein, in some embodiments, the remainder of each element of input matrices (e.g., matrices A and B) modulo several integers $m_1, m_2, \ldots m_k$ are precomputed and then used to compute dot products modulo each integer. Because the moduli $m_1, m_2, \ldots m_k$ have smaller bit widths than the elements of the input matrices, computing the dot products modulo each integer is less computationally expensive than a single full-bit-width dot product. In various embodiments, the value of the full-bit-width dot product is reconstructed from the smaller bit width dot products. As described in further detail herein, accuracy is guaranteed by the Chinese remainder theorem.

As described in further detail herein, in some embodiments, the value of the full-bit-width dot product is reconstructed by multiplying each dot product modulo result $s_i$ with a specified chosen number (referred to herein as a "magic number"), summing these results, and applying an additional modulo operation. As described in further detail herein, magic numbers $\alpha_i$ can be chosen so that $\alpha_i$ is congruent to 1 mod $m_i$ and congruent to 0 mod all other $m_j$. Moduli are chosen so that M (the product of all moduli multiplied with each other) is sufficiently large for the desired application. This is the case when values in input matrices are sufficiently small. For many applications, e.g., neural networks, most inputs to compute dot products are numerically small, meaning M will be sufficiently large. As described in further detail herein, a leading-one detector may be used to determine whether M is sufficiently large.

The following numerical example illustrates calculation of a full-bit-width dot product result using smaller bit width dot products. Suppose a dot product between a row of matrix A with values (23, 1) and a column of matrix B with values (7, 161) is desired. The final result, $C_{ij}$, is expected to be 23*7+1*161=322. Typically, 8-bit representations would be needed because one of the elements, 161, is 8 bits wide. However, in this example, reconstruction is possible based on the inputs modulo 13, 15, and 16. The inputs modulo 13 are: A≡(10, 1) mod 13 and B≡(7, 5) mod 13. Stated alternatively, the A input row is congruent to (10, 1) mod 13, and the B input column is congruent to (7, 5) mod 13. This is because the remainder of the A input row after division by 13 is (10, 1) (23 divided by 13 yields a remainder of 10, and 1 divided by 13 yields a remainder of 1), and the remainder of the B input column after division by 13 is (7, 5). The inputs modulo 15 are: A≡(8, 1) mod 15 and B≡(7, 11) mod 15. The inputs modulo 16 are: A≡(7, 1) mod 16 and B≡(7, 1) mod 16. In this example, moduli $\{m_1, m_2, m_3\}$={13, 15, 16}.

In this numerical example, the modulo dot products are: A·B=(10*7+1*5)=75≡10 mod 13, A·B=(8*7+1*11)=67≡7 mod 15, and A·B=(7*7+1*1)=50≡2 mod 16. Thus, in this example, remainders $\{r_1, r_2, r_3\}$={10, 7, 2}. In this example, the final result $C_{ij}$ can be calculated as $C_{ij}$=($\alpha_1$*$r_1$+$\alpha_2$*$r_2$+$\alpha_3$*$r_3$) mod ($m_1$*$m_2$*$m_3$), where $\{\alpha_1, \alpha_2, \alpha_3\}$ are magic numbers {2640, 1456, 2145}. Magic number selection criteria are discussed in further detail below. Thus $C_{ij}$=(2640*10+1456*7+2145*2) mod (13*15*16)=322, which is equal to the expected result based on computing the dot product 23*7+1*161 using 8-bit numbers. An advantage of the modular math approach is that only small-bit inputs (e.g., 4-bit values) are used, which is less costly in terms of computational burden and energy consumption.

The Chinese remainder theorem guarantees accuracy of the modular math approach if certain conditions are met. The Chinese remainder theorem states that if an unknown positive integer N is congruent to remainders $r_1, r_2, \ldots r_k$ mod $m_1, m_2, \ldots m_k$, wherein $m_1, m_2, \ldots m_k$ are coprime integers whose product $\Pi_{i=1}^{i=k} m_i$=M, N can be constructed uniquely assuming that N<M. The conditions for the Chinese remainder theorem are met in the above numerical example (where N=322, $\{r_1, r_2, r_3\}$={10, 7, 2}, $\{m_1, m_2, m_3\}$={13, 15, 16}, and M=13*15*16=3120) because 322≡10 mod 13, 322≡7 mod 15, 322≡2 mod 16, {13, 15, 16} are coprime, and 322<3120. As described in further detail herein, whether the modular math approach can be used to calculate a matrix element $C_{ij}$ using small-bit inputs (e.g., 4-bit values) depends on whether $C_{ij}$ is less than M. In various embodiments, whether $C_{ij}$ is less than M can be determined by estimating the bit width of $C_{ij}$ using a leading-one detector with the dot product inputs.

In some embodiments, magic numbers at are selected according to: $\alpha_\ell$ are selected according to: $\alpha_\ell$ mod $m_\lambda$=1 if $\lambda = \ell$ and $\alpha_\ell$ mod $m_\lambda$=0 if $\lambda \neq \ell$. Then $C_{ij}$ can be reconstructed according to: $C_{ij}=(\sum_{\ell=1}^{k} \alpha_\ell (C_{ij} \mod m_\ell)) \mod M$. Note that ($C_{ij}$ mod $m_\ell$) are the remainders $r_1, r_2, \ldots r_k$. This reconstruction approach is illustrative and not restrictive. Other ways of reconstructing $C_{ij}$ from the remainders are also possible. Use of this reconstruction and its accuracy are illustrated in the numerical example above. As can be verified in the numerical example above, the magic numbers $\{\alpha_1, \alpha_2, \alpha_3\}$={2640, 1456, 2145} meet the selection criteria listed above. For example, $\alpha_1$ mod $m_1$=1 because 2640 mod 13=1, $\alpha_1$ mod $m_2$=0 because 2640 mod 15=0, and $\alpha_1$ mod $m_3$=0 because 2640 mod 16=0. The above numerical example illustrates a dot product associated with 2×2 matrices. This numerical example is illustrative and not restrictive. As is readily apparent to one skilled in the art, the techniques described above are generally applicable to multiplication of matrices of any size.

While 8-bit integer multiplication is used as an example, the hardware and techniques described herein are also applicable to multiplying matrices of numbers in other formats, such as integers of other bit widths, signed integers, floating-point numbers, positive numbers, and so forth. To perform multiplication of numbers in another desired format (e.g., floating point), all elements of input matrices could be converted into unsigned integers, the techniques described herein could be used to multiply unsigned integers, and then the results could be converted to the desired format (e.g., floating point).

Figure 1:
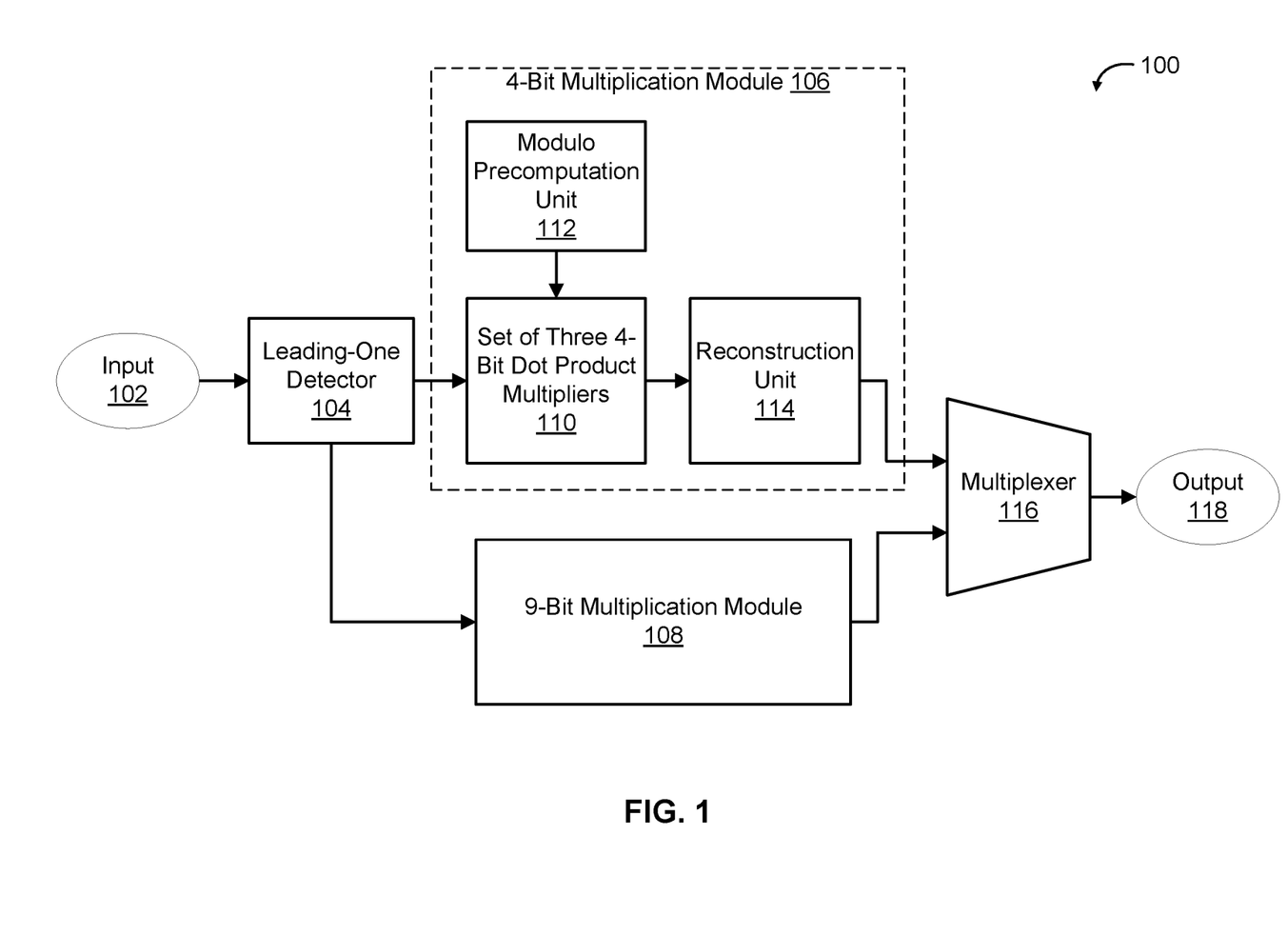
FIG. 1 is a block diagram illustrating an embodiment of a system for performing matrix multiplication in hardware using modular math.

FIG. 1 is a block diagram illustrating an embodiment of a system for performing matrix multiplication in hardware using modular math. Matrix multiplication system 100 takes input 102 and produces output 118. In some embodiments, input 102 is a row of matrix A and a column of matrix B, wherein A and B are to be multiplied. In various embodiments, output 118 is a single value equal to the dot product of the row of matrix A and the column of matrix B. Stated alternatively, in various embodiments, matrix multiplication system 100 performs a dot product operation. In order to multiply two matrices A and B, numerous dot products between rows of A and columns of B need to be computed. For example, if A and B are n×n matrices, the resulting product matrix C will also be n×n, meaning $n^2$ dot products need to be computed to determine C. Thus, the system shown in FIG. 1 would be used $n^2$ times to multiply two n×n matrices.

The example shown in FIG. 1 includes leading-one detector 104, 4-bit multiplication module 106, 9-bit multiplication module 108, and multiplexer 116. Leading-one detector 104 receives input 102, and based on input 102, determines whether a small-bit multiplication module (in this case, 4-bit multiplication module 106) can be used to compute a dot product instead of a large-bit multiplication module (in this case, 9-bit multiplication module 108). The example shown in FIG. 1 is configured for multiplication of matrices of 8-bit integers (signed or unsigned). For this reason, a 9-bit multiplication module is included for dot products that require full 8-bit representations (9 bits are needed for signed 8-bit numbers). The example shown in FIG. 1 pairs the 9-bit multiplication module with a 4-bit multiplication module as the small-bit multiplication module alternative for which computational and energy savings can be achieved if leading-one detector 104 determines that the small-bit multiplication module can be used. The example of FIG. 1 is illustrative and not restrictive. Multiplication of inputs of other bit widths is also possible, and the system shown in FIG. 1 could be modified to use different multiplication modules configured to handle other bit widths.

In the example shown, leading-one detector 104 determines if a dot product of a row of a matrix A and a column of a matrix B would generate an element $C_{ij}$ of a matrix C that can be computed using 4-bit multiplication (e.g., using 4-bit multiplication module 106). Stated alternatively, it is determined if $C_{ij}$ can be generated accurately based on 4-bit input representations (base ten values ranging from 0 through 15). In some embodiments, $C_{ij}$ is generated based on 4-bit remainders of modulo operations (also referred to herein as mod operations). For example, modulo result matrices of A and B corresponding to modulo 13, 15, and 16 of elements of each matrix can be calculated, in which case determining whether 4-bit multiplication module 106 can be used corresponds to determining whether $C_{ij}$ is less than M=13*15*16=3120 (according to the Chinese remainder theorem). If 4-bit multiplication module 106 cannot be used, then 9-bit multiplication module 108 would be used. Because M=3120 has a bit width of 12, $C_{ij}$ will be less than M if $C_{ij}$ has a bit width of no more than 11.

In some embodiments, leading-one detector 104 determines if $C_{ij}$ is a specified bit width (e.g., 11) or less by estimating the bit width of $C_{ij}$ based on input 102. For example, leading-one detector 104 can first find the index of the leading one for all input values. Then, for each element $A_{ik}B_{kj}$ in a dot product, leading-one detector 104 can add corresponding leading-one indices. If any element $A_{ik}B_{kj}$ has an index sum greater or equal to the bit width of M, then it can be determined that 9-bit multiplication module 108 should be used. Otherwise, an upper bound can be given to each element $A_{ik}B_{kj}$, and these upper bounds can be summed (e.g., using an adder tree). If this sum's bit width is less than the bit width of M, then it can be determined that $C_{ij}$ is less than M.

In the numerical example described previously (the dot product 23*7+1*161=322), 23*7=161, which is a bit width of 8. An upper bound could be the largest 8-bit number (255). Similarly, the upper bound for 1*161 could also be 255. The sum of these upper bounds would be 510, a 9-bit number, thus indicating that $C_{ij}$ has a bit width of no more than 11 (indicating $C_{ij}$ is less than M). The above is illustrative and not restrictive. Other ways to determine upper bounds is possible, and, in general, other leading-one prediction techniques are possible. The above example involves unsigned 8-bit integers. Variations of the above may be needed for signed 8-bit integers (e.g., different upper bounds on dot product elements).

In various embodiments, leading-one detector 104 is implemented using digital electronic circuits (e.g., assemblies of digital logic gates printed on integrated circuits). For example, in some embodiments, leading-one detector 104 includes an adder tree to sum upper bounds associated with dot product elements. In addition, in various embodiments, leading-one detector 104 includes control logic (e.g., a switch or multiplexer) that forwards input 102 to either 4-bit multiplication module 106 or 9-bit multiplication module 108. In various embodiments, control lines (not shown in FIG. 1) from leading-one detector 104 connect to multiplexer 116 to direct multiplexer 116 to forward the output of 4-bit multiplication module 106 to output 118 when 4-bit multiplication module 106 is used and to forward the output of 9-bit multiplication module 108 to output 118 when 9-bit multiplication module 108 is used. Stated alternatively, in various embodiments, leading-one detector 104 data gates multiplexer 116.

In the example shown, 4-bit multiplication module 106 includes a set of three 4-bit dot product multipliers 110, modulo precomputation unit 112, and reconstruction unit 114. In the example shown, the set of three 4-bit dot product multipliers 110 is configured to compute a set of three dot products. In some embodiments, the set of three 4-bit dot product multipliers 110 computes dot products of precomputed sets of modulo values (e.g., modulo 13, 15, and 16) supplied by modulo precomputation unit 112. In some embodiments, modulo precomputation unit 112 generates modulo values for a row/column pair (e.g., input 102). In some embodiments, modulo precomputation unit 112 precomputes modulo values for entire matrices A and B to be multiplied. Modulo precomputation unit 112 can receive a row/column pair, multiple row/column pairs, entire matrices A and B to be multiplied, and so forth as inputs (inputs to modulo precomputation unit 112 not shown in FIG. 1). Stated alternatively, in various embodiments, precomputed sets of modulo values are supplied to the set of three 4-bit dot product multipliers 110, which performs the actual multiplication as well as an additional mod operation after each multiplication.

The numerical example described above involving the dot product of a row of A=(23, 1) and a column of B=(7, 161) can be used to illustrate the operation of the set of three 4-bit dot product multipliers 110 and modulo precomputation unit 112. Modulo precomputation unit 112 can generate modulo 13, 15, and 16 values of (23, 1) and (7, 161), which would be A≡(10, 1) mod 13, B≡(7, 5) mod 13, A≡(8, 1) mod 15, B≡(7, 11) mod 15, A≡(7, 1) mod 16, and B≡(7, 1) mod 16. The set of three 4-bit dot product multipliers 110 would then compute the modulo 13, 15, and 16 dot products, which would be 10*7+1*5=75, 8*7+1*11=67, and 7*7+1*1=50, respectively. The set of three 4-bit dot product multipliers 110 would then perform modulo operations: 75 mod 13=10, 67 mod 15=7, and 50 mod 16=2 to produce remainders $\{r_1, r_2, r_3\}=\{10, 7, 2\}$. The final mod operation and/or the summing of dot product elements may instead be performed by reconstruction unit 114. Stated alternatively, there are various ways to allocate tasks between the set of three 4-bit dot product multipliers 110 and reconstruction unit 114 in order to implement 4-bit multiplication module 106.

In the example illustrated, reconstruction unit 114 reconstructs the dot product result $C_{ij}$ (e.g., output 118) from modular math outputs of the set of three 4-bit dot product multipliers 110. In various embodiments, reconstruction is performed by multiplying remainders with magic numbers, summing the results, and performing a final mod operation. As described above, $C_{ij}$ can be reconstructed according to:

$C_{ij}=(\sum_{\ell=1}^{k} \alpha_\ell (C_{ij} \mod m_\ell)) \mod M$, where $\alpha_\ell$ are specifically chosen magic numbers, ($C_{ij}$ mod $m_\ell$) are remainders $r_1, r_2, \ldots r_k$, and M is the product of all the moduli $m_1, m_2, \ldots m_k$ multiplied with each other. As described above, magic numbers $\alpha_\ell$ can be selected according to: $\alpha_\ell$ mod $m_\lambda=1$ if $\lambda=\ell$ and $\alpha_\ell$ mod $m_\lambda=0$ if $\lambda \neq \ell$. In the numerical example above, a set of magic numbers meeting the magic number criteria is $\{\alpha_1, \alpha_2, \alpha_3\}=\{2640, 1456, 2145\}$, $\{r_1, r_2, r_3\}=\{10, 7, 2\}$, and M=13*15*16=3120. Thus, the reconstructed value would be $C_{ij}=(2640*10+1456*7+2145*2)$ mod 3120=322. The reconstruction computational burden is not high because the magic numbers are pre-selected and there are only three multiplications.

In various embodiments, 4-bit multiplication module 106 is implemented using digital electronic circuits (e.g., assemblies of digital logic gates printed on integrated circuits). In various embodiments, 4-bit multiplication module 106 includes various adding circuits (e.g., to add dot product elements, add magic number/remainder products, etc.). These can be implemented using basic digital logic gates. In the example illustrated, 4-bit multipliers are required. 4-bit multipliers can be implemented in numerous ways. For example, as is readily apparent to one skilled in the art, each 4-bit multiplier can be implemented as a plurality of 2-bit multipliers and a plurality of adders, wherein each 2-bit multiplier and adder is implemented using basic digital logic gates. In various embodiments, modulo precomputation unit 112 is also implemented using basic digital logic gates. As described below, the implementation of mod operations can be simplified and the computational burden of mod operations can be reduced via hardware optimizations. The multiplication in reconstruction unit 114 can be implemented as a specialized digital electronic circuit that is configured to multiply pre-selected, hardcoded magic numbers with a limited set of numbers (e.g., only 4-bit numbers). Thus, 4-bit multiplication module 106 can be optimized for computational and energy efficiency.

Modulo operations (e.g., those used in 4-bit multiplication module 106) are less computationally expensive than multiplications and can be made more efficient through specialized logic adapted to specific moduli. For example, modulo 16 can be performed by discarding all bits higher than the $4^{th}$ bit (23 bit) of a number. Modulo 13 and 15 of an 8-bit number can be simplified by noting that an 8-bit number x can be written as $x=16*x_1+x_2$, where $x_2$ is the lower 4-bit portion, and $x_1$ is the upper 4-bit portion. For example, 161 (10100001 in binary) can be written as 16*10+1, where 1 (0001 in binary) is the $x_2$ portion and 10 (1010 in binary) is the $x_1$ portion. Thus, x mod 15 can be written as $(16*x_1)$ mod $15+(x_2)$ mod 15, which simplifies to $(1*x_1)$ mod $15+(x_2)$ mod 15 (because 16 mod 15=1), which simplifies to $(x_1+x_2)$ mod 15 (simplifying to 4-bit addition with a mod operation). Thus, the result would be $x_1+x_2$ if $x_1+x_2$ is less than 15. If $x_1+x_2$ equals 15, the result would be 0. If $x_1+x_2$ is larger than a 4-bit number, the above technique of breaking that number into a lower 4-bit portion and an upper 4-bit portion can be used again. Similarly, x mod 13 can be simplified to $(3*x_1+x_2)$ mod 13 and corresponding optimizations can be used to arrive at a result. Similar simplifications and optimizations can be used for other moduli.

In the example illustrated, 9-bit multiplication module 108 is used when leading-one detector 104 determines that 4-bit multiplication module 106 cannot be used. In various embodiments, 9-bit multiplication module 108 is implemented using digital electronic circuits (e.g., assemblies of digital logic gates printed on integrated circuits). Various implementations of 9-bit multipliers are known in the art (e.g., serial multipliers, pipelined multipliers, combinatorial multipliers, etc.). 9-bit multiplication module 108 is more complex than the 4-bit dot product multipliers in 4-bit multiplication module 106 and requires more power than 4-bit multiplication module 106. Thus, an advantage of using modular math to allow for lower-bit multiplication is reduced power consumption.

In the example illustrated, multiplexer 116 acts as a switch that allows either 4-bit multiplication module 106 or 9-bit multiplication module 108 (but not both) to produce output 118. In various embodiments, multiplexer 116 is controlled by leading-one detector 104 (connections not shown in FIG. 1), which determines which multiplication module is used for each input 102. Multiplexer 116 can be implemented using basic digital logic gates, as is readily apparent to one skilled in the art.

Although the example illustrated in FIG. 1 involves multiplication of 8-bit numbers, multiplication of numbers of other bit widths is also possible with straightforward modifications to matrix multiplication system 100. For example, in some embodiments, for multiplication of 10-bit numbers, a 6-bit multiplication module using modular math and a 10-bit multiplication could be used (and techniques similar to those described above could be used to implement the modulo precomputation, multiplication, and reconstruction).

In the example illustrated in FIG. 1, portions of the communication path between the components are shown. Other communication paths may exist, and the example of FIG. 1 has been simplified to illustrate the example clearly. For example, as described above, inputs to modulo precomputation unit 112 and connections between leading-one detector 104 and multiplexer 116 are not shown explicitly in FIG. 1. Although single instances of components have been shown to simplify the diagram, additional instances of any of the components shown in FIG. 1 may exist. The number of components and the connections shown in FIG. 1 are merely illustrative. For example, additional instances of inputs, leading-one detectors, multiplication modules, multiplexers, and outputs may be used to allow for more parallel processing. Components not shown in FIG. 1 may also exist.

Figure 2:
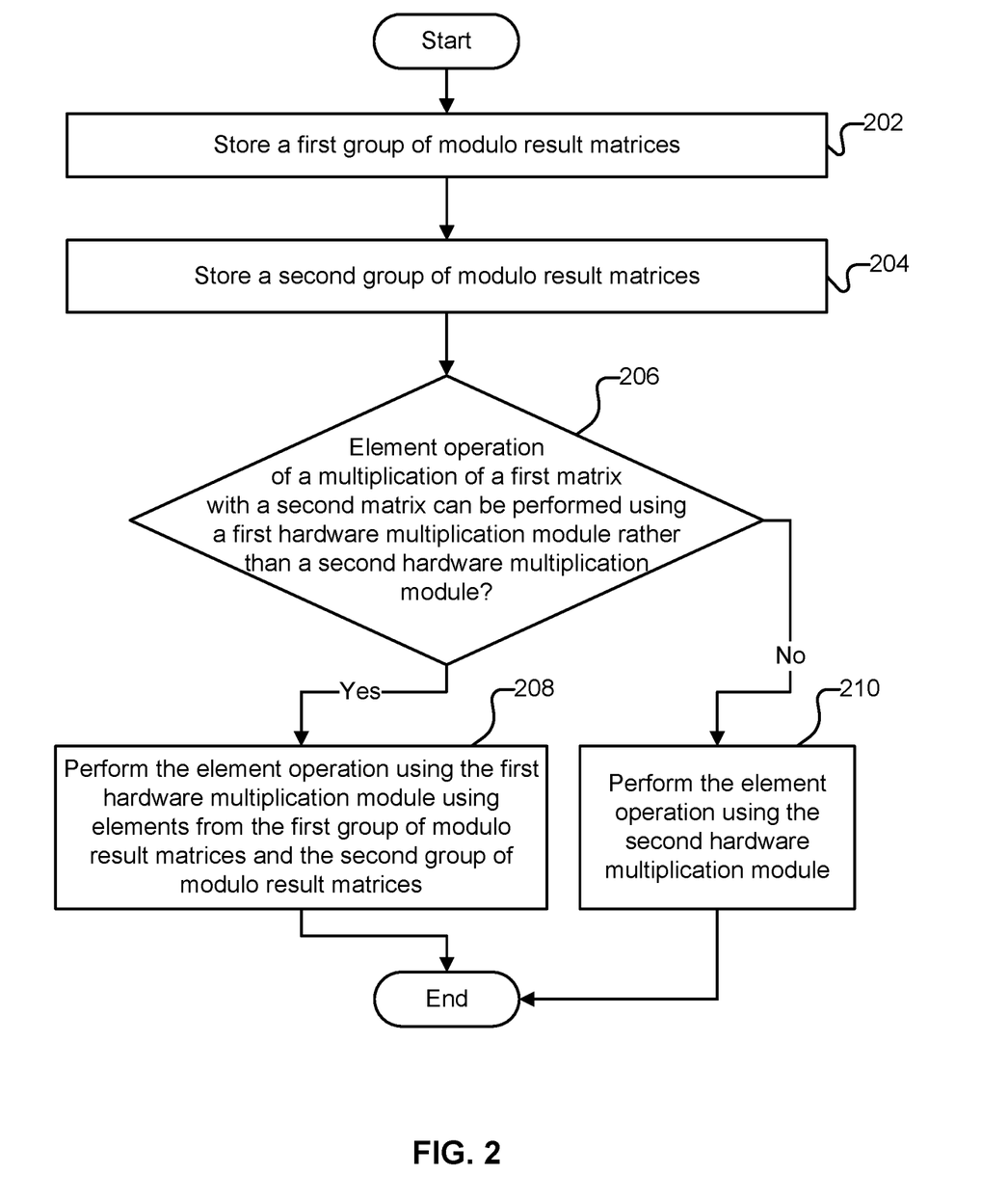
FIG. 2 is a flow chart illustrating an embodiment of a process for performing matrix multiplication in hardware using modular math.

FIG. 2 is a flow chart illustrating an embodiment of a process for performing matrix multiplication in hardware using modular math. In some embodiments, the process of FIG. 2 is performed by matrix multiplication system 100 of FIG. 1. In various embodiments, the process of FIG. 2 involves determining the product of two matrices A and B by computing dot products associated with multiplying A and B.

At 202, a first group of modulo result matrices, e.g., corresponding to modulo of elements of a first matrix by each of a plurality of moduli, is stored. For example, the first group of modulo result matrices may correspond to modulo of elements in a matrix A by a set of three moduli for performing modular math using 4-bit dot product multipliers (e.g., the moduli 13, 15, and 16). In some embodiments, the first group of modulo result matrices are generated by modulo precomputation unit 112 of FIG. 1. The first group of modulo result matrices may be stored in memory, including any of the following forms: processor registers, volatile memory, random access memory (RAM), and/or non-volatile memory, e.g., flash RAM.

At 204, a second group of modulo result matrices, e.g., corresponding to modulo of elements of a second matrix by each of the plurality of moduli, is stored. For example, the second group of modulo result matrices may correspond to modulo of elements in a matrix B by the set of three moduli for performing modular math using 4-bit dot product multipliers (e.g., the moduli 13, 15, and 16). In some embodiments, the second group of modulo result matrices are generated by modulo precomputation unit 112 of FIG. 1. The second group of modulo result matrices may be stored in memory, including any of the following forms: processor registers, volatile memory, random access memory (RAM), and/or non-volatile memory, e.g., flash RAM.

At 206, it is determined whether an element operation of a multiplication of the first matrix with the second matrix can be performed using a first hardware multiplication module rather than a second hardware multiplication module. For example, the element operation may be a dot product formed by multiplying a row of the first matrix with a column of the second matrix. In some embodiments, leading-one detector 104 of FIG. 1 determines whether the element operation can be performed by the first hardware multiplication module (e.g., a small-bit multiplication module such as 4-bit multiplication module 106 of FIG. 1) rather than the second hardware multiplication module (e.g., a large-bit multiplication module such as 9-bit multiplication module 108 of FIG. 1). See FIG. 3 for an example of a process for determining a multiplication module to use to perform an element operation associated with a matrix multiplication.

If at 206 it is determined that the element operation can be performed using the first hardware multiplication module, at 208, the element operation is performed using the first hardware multiplication module including by multiplying one or more corresponding elements from the first group of modulo result matrices with one or more corresponding elements from the second group of modulo result matrices. In some embodiments, the first hardware multiplication module (e.g., a small-bit multiplication module such as 4-bit multiplication module 106 of FIG. 1) multiplies rows from the first group of modulo result matrices with columns from the second group of modulo result matrices to form modulo dot products. In some embodiments, this multiplication is performed by the set of three 4-bit dot product multipliers 110 of FIG. 1. In some embodiments, reconstruction unit 114 of FIG. 1 uses the results of the set of three 4-bit dot product multipliers 110 to reconstruct a value associated with the element operation of the multiplication of the first matrix with the second matrix. See FIG. 4 for an example of a process for performing an element operation using the first hardware multiplication module.

If at 206 it is determined that the element operation cannot be performed using the first hardware multiplication module, at 210, the element operation is performed using the second hardware multiplication module. In some embodiments, the second hardware multiplication module is 9-bit multiplication module 108 of FIG. 1.

Figure 3:
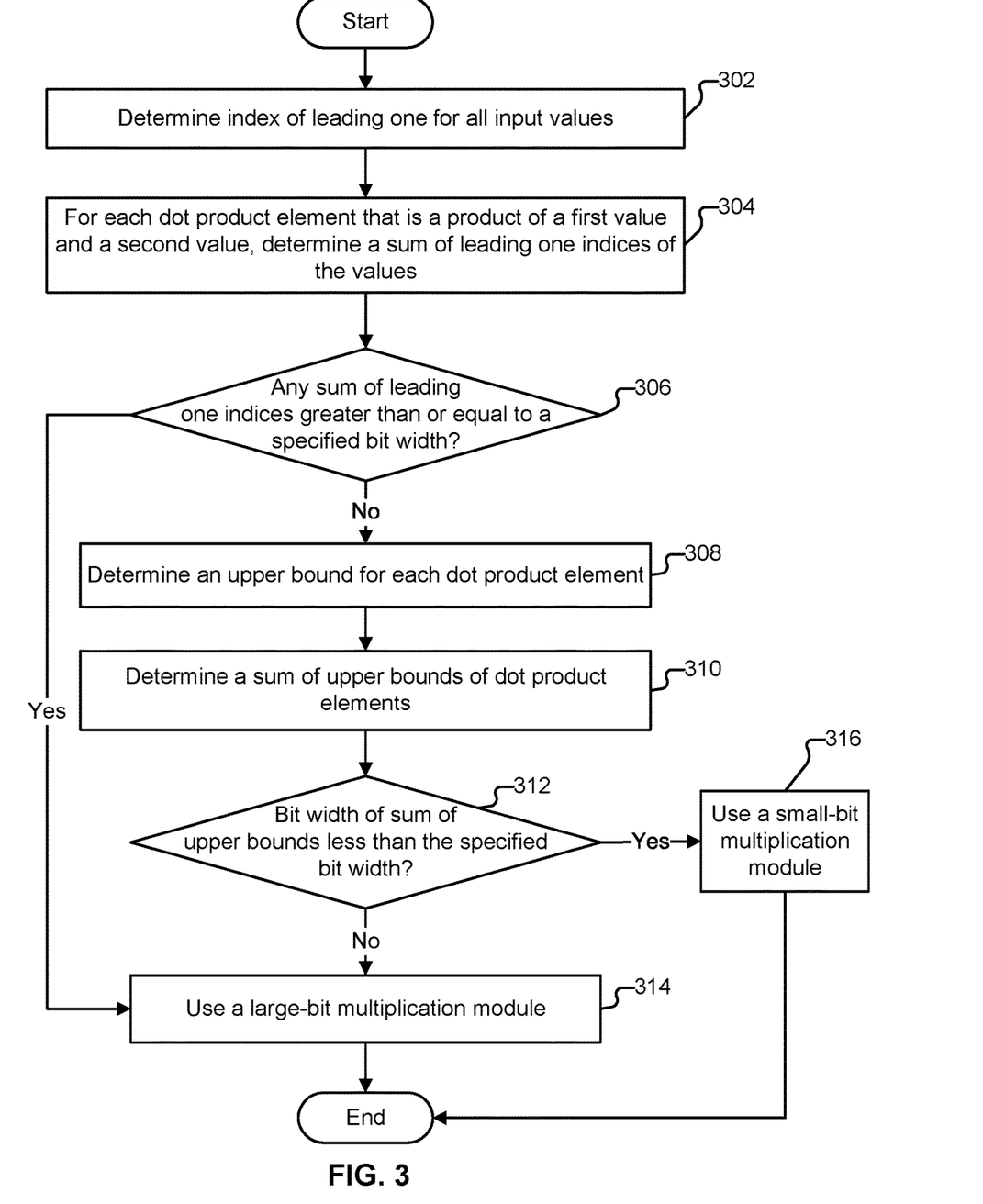
FIG. 3 is a flow chart illustrating an embodiment of a process for determining a multiplication module to use to perform an element operation associated with a matrix multiplication.

FIG. 3 is a flow chart illustrating an embodiment of a process for determining a multiplication module to use to perform an element operation associated with a matrix multiplication. In some embodiments, the process of FIG. 3 is performed by leading-one detector 104 of FIG. 1. In some embodiments, at least a portion of the process of FIG. 3 is performed in 206 of FIG. 2.

At 302, a leading one index is determined for all input values. In some embodiments, input values correspond to a row of numbers and a column of numbers to be multiplied to produce a dot product result. For example, the numbers may be 8-bit unsigned integers. As an example, a row/column pair of 8-bit integer numbers, 1 and 161, may be multiplied to produce a dot product element 1*161=161. The numbers in binary are 00000001 and 10100001, respectively. The leading-one indices are 1 and 8, respectively (or 0 and 7, respectively, if counting of bit position starts at zero).

At 304, for each dot product element that is a product of a first value and a second value, a sum of leading-one indices is determined. In the above example, the dot product element 1*161=161 has leading one-indices of 1 and 8 or 0 and 7 (depending on whether counting of bit position starts at 1 or 0). Thus, the sum of leading-one indices for this dot product element is 9 or 7 (depending on whether counting of bit position starts at 1 or 0).

At 306, it is determined whether any sum of leading-one indices (of any dot product element) is greater or equal to a specified bit width. In the above example, the sum of the bit widths of 1 (bit width of 1) and 161 (bit width of 8) would be 9. In some embodiments, this summed bit width is compared to a bit width of a value that is the product of moduli. For example, this product of moduli could be M=the product of the moduli 13, 15, and 16 described with respect to 4-bit multiplication module 106 of FIG. 1. In this example, M=3120, which is a 12-bit number. In some embodiments, step 306 is not included. Step 306 may be used as an optimization that allows for a quick determination of whether to use a large-bit multiplication module if one dot product element is very large. It is possible to determine a multiplication module to use by performing the process of FIG. 3 without step 306.

If at 306 it is determined that there is a sum of leading-one indices of a dot product element that is greater than or equal to the specified bit width (e.g., bit width of 12 corresponding to M=3120), at 314, a large-bit multiplication module is used. This is because, in the above example, a sum of leading-one indices greater than or equal to 12 could signify a dot product element value (and thus full dot product value) greater than M, which would violate a condition of the Chinese remainder theorem (described above) used to guarantee the accuracy of using a small-bit multiplication module based on modular math. In the above example, this could mean using a 9-bit multiplication module instead of a 4-bit multiplication module. The large-bit multiplication module does not rely on modular math. In some embodiments, the large-bit multiplication module is 9-bit multiplication module 108 of FIG. 1.

If at 306 it is determined that there is no sum of leading-one indices of a dot product element that is greater than or equal to the specified bit width, at 308, an upper bound for each dot product element is determined. An example way to determine the upper bound for each dot product element is to add upper bounds of the first value and second value that form each dot product element. For example, the upper bound for the dot product element 1*161=161 may be 1 (largest 1-bit number)+255 (largest 8-bit number)=256. This example is illustrative and not restrictive. Other ways of forming upper bounds are also possible.

At 310, a sum of upper bounds of dot product elements is determined. In some embodiments, the sum of upper bounds of dot product elements is determined by summing individual upper bounds of each dot product element. In the above example, the upper bound for the dot product element 1*161=161 is 256. Suppose, another dot product element is 23*7=161. Using the above example procedure for determining an upper bound for a dot product element yields 31 (largest 5-bit number, corresponding to an upper bound for 23)+7 (largest 3-bit number, corresponding to an upper bound for 7)=38. The sum of upper bounds of dot product elements in this example would be 256+38=294.

At 312, it is determined whether the bit width of the sum of upper bounds is less than the specified bit width (e.g., bit width of 12 for M=3120 in the above example). A sum of upper bounds that is greater than or equal to the specified bit width (e.g., 12, corresponding to M=3120 in the above example) could signify a dot product value greater than a specified value (e.g., M), which would violate a condition of the Chinese remainder theorem (described above) used to guarantee the accuracy of using a small-bit multiplication module based on modular math. If at 312 it is determined that the bit width of the sum of upper bounds is not less than the specified bit width, at 314, a large-bit multiplication module is used. In some embodiments, the large-bit multiplication module is 9-bit multiplication module 108 of FIG. 1.

If at 312 it is determined that the bit width of the sum of upper bounds is less than the specified bit width, at 316, a small-bit multiplication module is used. In some embodiments, the small-bit multiplication module is 4-bit multiplication module 106 of FIG. 1. When the sum of upper bounds is less than the specified bit width, the dot product of the input values (e.g., of input 102 of FIG. 1) is less than a specified value (e.g., M), which satisfies a condition of the Chinese remainder theorem (describe above) used to guarantee the accuracy of using a small-bit multiplication module based on modular math.

Figure 4:
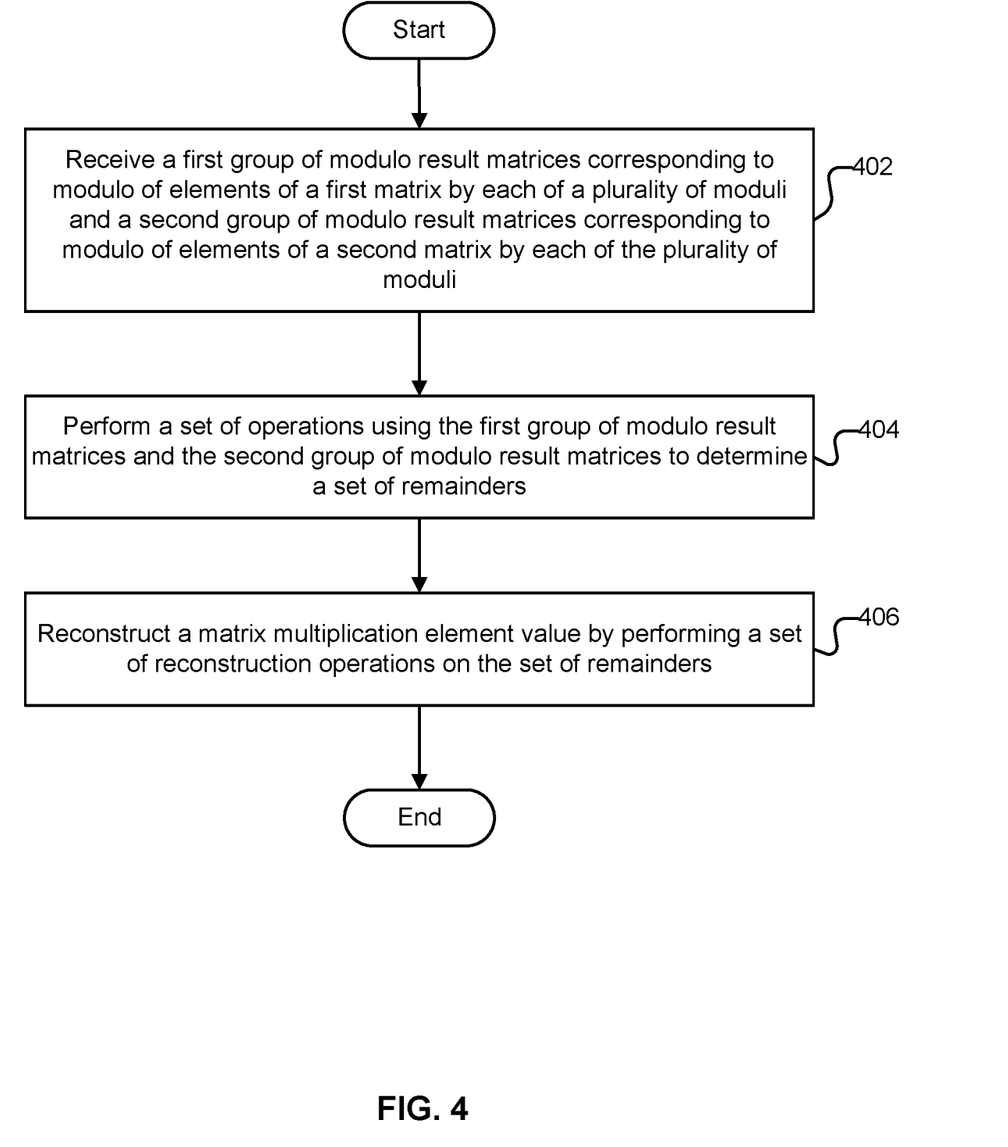
FIG. 4 is a flow chart illustrating an embodiment of a process for performing an element operation associated with a matrix multiplication using a multiplication module that uses modular math.

FIG. 4 is a flow chart illustrating an embodiment of a process for performing an element operation associated with a matrix multiplication using a multiplication module that uses modular math. In some embodiments, the process of FIG. 4 is performed by 4-bit multiplication module 106 of FIG. 1. In some embodiments, at least a portion of the process of FIG. 4 is performed in 208 of FIG. 2.

At 402, a first group of modulo result matrices corresponding to modulo of elements of a first matrix by each of a plurality of moduli and a second group of modulo result matrices corresponding to modulo of elements of a second matrix by each of the plurality of moduli are received. In some embodiments, the first and second groups of modulo result matrices are retrieved from memory where they are stored. In some embodiments, the modulo result matrices correspond to modulo of elements by a set of three moduli for performing modular math using 4-bit dot product multipliers (e.g., the moduli 13, 15, and 16), meaning the values in the modulo result matrices can be represented as 4-bit numbers. In some embodiments, the modulo result matrices are generated by modulo precomputation unit 112 of FIG. 1.

At 404, a set of operations (including dot product operations) are performed using the first group of modulo result matrices and the second group of modulo result matrices to determine a set of remainders. For example, the set of operations may include a plurality of 4-bit multiplications, addition of 4-bit multiplication products, and a plurality of mod operations. In various embodiments, a row from a modulo result matrix from the first group of modulo result matrices is multiplied with a column from a modulo result matrix from the second group of modulo result matrices to form a dot product, to which a mod operation is applied to determine a remainder. In various embodiments, the number of modulo result matrices per group of modulo result matrices is the number of moduli (e.g., 3 when the moduli are 13, 15, and 16). This would correspond to a set of 3 remainders. In some embodiments, the set of operations are performed by the set of three 4-bit dot product multipliers 110 in FIG. 1.

At 406, a matrix multiplication element value is reconstructed by performing a set of reconstruction operations (including multiplication with magic numbers) on the set of remainders. In some embodiments, the matrix multiplication element value is a dot product result (e.g., output 118 of FIG. 1). In some embodiments, the matrix multiplication element value is determined by multiplying each remainder in the set of remainders by a specific magic number (see above for further details on how magic numbers are chosen), summing these products, and applying a mod operation. In some embodiments, this reconstruction is performed by reconstruction unit 114 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a memory configured to:
        store a first group of modulo result matrices corresponding to modulo of elements of a first matrix by each of a plurality of moduli; and
        store a second group of modulo result matrices corresponding to modulo of elements of a second matrix by each of the plurality of moduli; and
    an integrated circuit configured to:
        determine whether an element operation of a multiplication of the first matrix with the second matrix using a first hardware multiplication module rather than a second hardware multiplication module is ensured to be accurate; and
        in response to a determination that the element operation using the first hardware multiplication module is ensured to be accurate, perform the element operation using the first hardware multiplication module including by multiplying one or more corresponding elements from the first group of modulo result matrices with one or more corresponding elements from the second group of modulo result matrices.

2. The system of claim 1, wherein the plurality of moduli includes numbers thirteen, fifteen, and sixteen.

3. The system of claim 1, wherein the memory configured to store the first group of modulo result matrices and the second group of modulo result matrices is a random access memory.

4. The system of claim 1, wherein the integrated circuit is configured to determine whether the element operation of the multiplication of the first matrix with the second matrix using the first hardware multiplication module is ensured to be accurate including by being configured to determine a first bit width associated with a result of the element operation and compare the first bit width with a second bit width associated with a product equal to the plurality of moduli multiplied with each other.

5. The system of claim 4, wherein the integrated circuit is configured to determine the first bit width including by being configured to determine bit widths of elements of the first matrix and the second matrix and upper bounds associated with the bit widths of elements of the first matrix and the second matrix.

6. The system of claim 1, wherein the integrated circuit is configured to determine whether the element operation of the multiplication of the first matrix with the second matrix using the first hardware multiplication module is ensured to be accurate including by being configured to determine whether Chinese remainder theorem associated conditions are met.

7. The system of claim 1, wherein the element operation of the multiplication of the first matrix with the second matrix is a dot product operation.

8. The system of claim 1, wherein the first hardware multiplication module includes a group of four-bit dot product multipliers.

9. The system of claim 1, wherein the second hardware multiplication module is configured to handle larger bit-width numbers than the first hardware multiplication module.

10. The system of claim 1, wherein the integrated circuit is configured to perform the element operation using the first hardware multiplication module further including by applying a reconstruction after multiplying the one or more corresponding elements from the first group of modulo result matrices with the one or more corresponding elements from the second group of modulo result matrices.

11. The system of claim 10, wherein applying the reconstruction includes performing modulo operations to determine a group of remainders and multiplying each remainder from the group of remainders with a corresponding specified number from a group of specified numbers.

12. The system of claim 11, wherein each specified number in the group of specified numbers is associated with a corresponding modulus from the plurality of moduli for which the specified number modulo the corresponding modulus equals one and the specified number modulo any other modulus from the plurality of moduli equals zero.

13. The system of claim 11, wherein the first hardware multiplication module includes digital electronic circuits that are specifically adapted to perform multiplications associated with the group of specified numbers.

14. The system of claim 1, wherein the integrated circuit is further configured to forward an output of either the first hardware multiplication module or the second hardware multiplication module by using a multiplexer.

15. The system of claim 1, wherein the first matrix and the second matrix include unsigned integer elements.

16. The system of claim 1, wherein the first matrix and the second matrix include eight-bit elements.

17. The system of claim 1, wherein the determination that the element operation using the first hardware multiplication module is ensured to be accurate is based at least in part on an addition performed using an adder tree.

18. The system of claim 1, wherein the first hardware multiplication module includes digital logic gate implementations that are specifically adapted to perform modulo operations associated with the plurality of moduli.

19. A method, comprising:
- storing a first group of modulo result matrices corresponding to modulo of elements of a first matrix by each of a plurality of moduli;
- storing a second group of modulo result matrices corresponding to modulo of elements of a second matrix by each of the plurality of moduli;
- determining whether an element operation of a multiplication of the first matrix with the second matrix using a first hardware multiplication module rather than a second hardware multiplication module is ensured to be accurate; and
- in response to a determination that the element operation using the first hardware multiplication module is ensured to be accurate, performing the element operation using the first hardware multiplication module including by multiplying one or more corresponding elements from the first group of modulo result matrices with one or more corresponding elements from the second group of modulo result matrices.

20. A computer program product, the computer program product being embodied in a non-transitory computer readable storage medium and comprising computer instructions for:
- storing a first group of modulo result matrices corresponding to modulo of elements of a first matrix by each of a plurality of moduli;
- storing a second group of modulo result matrices corresponding to modulo of elements of a second matrix by each of the plurality of moduli;
- determining whether an element operation of a multiplication of the first matrix with the second matrix using a first hardware multiplication module rather than a second hardware multiplication module is ensured to be accurate; and
- in response to a determination that the element operation using the first hardware multiplication module is ensured to be accurate, performing the element operation using the first hardware multiplication module including by multiplying one or more corresponding elements from the first group of modulo result matrices with one or more corresponding elements from the second group of modulo result matrices.

* * * * *